(12) United States Patent
Gong et al.

(10) Patent No.: US 12,260,048 B2
(45) Date of Patent: Mar. 25, 2025

(54) DISPLAY DRIVING METHOD WITH TARGET REPORT RATE

(71) Applicant: Wuhan China Star Optoelectronics Semiconductor Display Technology Co., Ltd., Hubei (CN)

(72) Inventors: Houfu Gong, Hubei (CN); Zengjian Jin, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/517,113

(22) Filed: Nov. 22, 2023

(65) Prior Publication Data
US 2024/0411407 A1    Dec. 12, 2024

(30) Foreign Application Priority Data

Jun. 8, 2023   (CN) .................. 202310684559.X

(51) Int. Cl.
| | | |
|---|---|---|
| *G06F 3/033* | (2013.01) | |
| *G06F 3/0354* | (2013.01) | |
| *G06F 3/038* | (2013.01) | |
| *G06F 3/041* | (2006.01) | |
| *G06F 3/044* | (2006.01) | |

(52) U.S. Cl.
CPC ...... *G06F 3/04184* (2019.05); *G06F 3/03545* (2013.01); *G06F 3/0383* (2013.01); *G06F 3/04162* (2019.05); *G06F 3/0441* (2019.05); *G06F 3/0442* (2019.05); *G06F 2203/0384* (2013.01); *G06F 2203/04101* (2013.01); *G06F 2203/04102* (2013.01)

(58) Field of Classification Search
CPC ............ G06F 3/04162; G06F 3/04184; G06F 3/0441; G06F 3/0442; G06F 3/03545; G06F 3/0383; G06F 2203/0384; G06F 2203/04101; G06F 2203/04103
See application file for complete search history.

(56) References Cited

U.S. PATENT DOCUMENTS

| | | | | |
|---|---|---|---|---|
| 2015/0153845 A1* | 6/2015 | Chang | ................... | G06F 3/0441 345/179 |
| 2016/0306448 A1* | 10/2016 | Fleck | .................... | G06F 3/0442 |
| 2018/0024654 A1* | 1/2018 | Koike | ................... | G06F 3/0441 345/174 |
| 2018/0113519 A1* | 4/2018 | Yamamoto | ............ | G06F 3/0441 |

FOREIGN PATENT DOCUMENTS

CN     111868669 A    * 10/2020    ......... G06F 3/03545

* cited by examiner

*Primary Examiner* — Adam J Snyder
(74) *Attorney, Agent, or Firm* — Nathan & Associates; Menachem Nathan

(57) ABSTRACT

The display device includes a display panel. The display driving method includes: detecting noise from the display panel to obtain an in-panel noise value; sending target uplink information to an active stylus pen based on the in-panel noise value, and receiving target downlink information returned by the active stylus pen under a target pen voltage based on the target uplink information; and the target downlink information including position information; determining a coordinate distance value between position coordinates based on coordinate information of the position coordinates of the position information; and reporting contact information of the active stylus pen generated on the display panel at a target report rate based on the coordinate distance value.

8 Claims, 9 Drawing Sheets

DISPLAY DRIVING METHOD WITH TARGET REPORT RATE

CROSS-REFERENCE TO RELATED APPLICATION

This application claims priority to Chinese Patent Application No. 202310684559.X, filed on Jun. 8, 2023, the disclosure of which is incorporated herein by reference in its entirety.

TECHNICAL FIELD

The present disclosure relates to the field of display technologies, and in particular, to a display driving method, a display device, and an active stylus pen.

BACKGROUND

The existing flexible touch display device is provided with an active stylus pen to facilitate the operation of the flexible touch display device. In an operation process of the active stylus pen, a flexible display screen displays a corresponding picture or switches a picture according to the operation of the active stylus pen through signal interactions between a touch chip and the active stylus pen. Specifically, a flexible touch display device using the universal serial interface as a protocol is taken as an example; in an interaction process between the active stylus pen and the touch chip, the touch chip will receive a hand-grasp signal of the active stylus pen to realize the communication between the active stylus pen and the flexible touch display screen; and at the same time, the touch chip will also receive a touch signal of the active stylus pen to determine the operation of the active stylus pen, thereby enabling the flexible touch display screen to display a corresponding picture or switch a picture.

Due to a thin thickness of the flexible display screen, a distance between a touch electrode layer (TX electrode/RX electrode) and a cathode in the flexible display screen is closer, the closer distance results in a tighter coupling between the touch electrode layer and the cathode, thereby resulting in greater noise from the display screen to the touch electrode layer and resulting in a poorer signal to interference plus noise ratio (SNR) of the active stylus pen. Especially, when the flexible display screen displays a picture with high noise, the SNR of the active stylus pen cannot meet the requirements, thereby resulting in problems such as broken lines when the active stylus pen writes on the flexible display screen.

SUMMARY

The present disclosure provides a display driving method, a display device, and an active stylus pen, which can improve the SNR of the active stylus pen when high noisy pictures need to be displayed on a flexible display screen, improve the writing performance of the active stylus pen, and ensure the use effect of the active stylus pen.

In a first aspect, the present disclosure provides a display driving method applied to a display device. The display device includes a display panel, and the display driving method includes: detecting noise from the display panel to obtain an in-panel noise value; sending target uplink information to an active stylus pen based on the in-panel noise value, and receiving target downlink information returned by the active stylus pen under a target pen voltage based on the target uplink information; and the target downlink information includes position information; determining, based on coordinate information of the position coordinates of the position information, a coordinate distance value between position coordinates; and reporting, based on the coordinate distance value, contact information generated by the active stylus pen on the display panel at a target report rate.

In an embodiment of the present disclosure, the display panel includes display time frames. Each of the display time frames includes a first time period, a second time period, and a third time period in sequence. The detecting noise from the display panel to obtain in-panel noise value includes: receiving noise detection signals in a second time period of a current display time frame; and detecting the noise from the display panel based on the noise detection signals, thereby obtaining the in-panel noise value.

In an embodiment of the present disclosure, the sending target uplink information to an active stylus pen based on the in-panel noise value, and receiving target downlink information returned by the active stylus pen under a target pen voltage based on the target uplink information includes: sending the target uplink information to the active stylus pen in the second time period of the current display time frame based on the in-panel noise value; and receiving, based on the target uplink information, the target downlink information returned by the active stylus pen under the target pen voltage based on the target uplink information in the second time period of the current display time frame, a third time period of the current display time frame, and a first time period of a next display time frame.

In an embodiment of the present disclosure, the target uplink information includes first uplink information and second uplink information. The target pen voltages includes a first pen voltage and a second pen voltage. The first pen voltage is smaller than the second pen voltage; and the sending target uplink information to an active stylus pen based on the in-panel noise value, and receiving target downlink information returned by the active stylus pen under a target pen voltage based on the target uplink information includes: comparing the in-panel noise value with a preset noise threshold value; in response to the in-panel noise value being smaller than the preset noise threshold value, sending the first uplink information to the active stylus pen, and receiving the target downlink information returned by the active stylus pen under the first pen voltage based on the first uplink information; and in response to the in-panel noise value being greater than the preset noise threshold value, sending the second uplink information to the active stylus pen, and receiving the target downlink information returned by the active stylus pen under the second pen voltage based on the second uplink information.

In an embodiment of the present disclosure, the determining, based on coordinate information of position coordinates of the position information, a coordinate distance value between the position coordinates includes: determining whether the number of position information of the target downlink information in a current display time frame is greater than 1; in response to the number of the position information of the target downlink information in the current display time frame is greater than 1, determining, based on coordinate information of at least two position information of the position information in the target downlink information in the current display time frame, the coordinate distance value between the at least two position coordinates; and in response to the number of the position information of the target downlink information in the current display time frame is equal to 1, determining, based on coordinate information of the position information of the target downlink information in the current display time frame and coordinate information of the position information in the target downlink information in a previous display time frame, the coordinate distance value between the two position coordinates, or determining, based on coordinate information of the position information of the target downlink information in the current display time frame and coordinate information of the position information of target downlink information in a next display time frame, the coordinate distance value between the two position coordinates.

In an embodiment of the present disclosure, the target report rate includes a first report rate and a second report rate. The first report rate is greater than the second report rate; the reporting, based on the coordinate distance value, contact information generated by the active stylus pen on the display panel at a target report rate includes: comparing the coordinate distance value with a preset distance threshold value; in response to the coordinate distance value being greater than the preset distance threshold value, reporting the contact information generated by the active stylus pen on the display panel at the first report rate; and in response to the coordinate distance value being smaller than the preset distance threshold value, reporting the contact information generated by the active stylus pen on the display panel at the second report rate.

In an embodiment of the present disclosure, the target uplink information includes scanning sequential information and frequency hopping information. The scanning sequential information is configured to indicate a work time sequence of a touch chip and a work time sequence of the active stylus pen. The frequency hopping information is used to indicate waveform frequency points of the target downlink information of the active stylus pen.

In an embodiment of the present disclosure, the target downlink information further includes response information, inclination angle information, pressure information, and identification number information of the active stylus pen.

In a second aspect, the display device includes a display panel and a touch chip connected to the display panel; and the touch chip is configured to execute the display driving method as mentioned in the first aspect.

In a third aspect, the present disclosure provides an active stylus pen, the active stylus pen is configured to receive the target uplink information sent by the touch chip and use target pen voltages to send target downlink information based on the target uplink information.

In the interaction process between the touch chip and the active stylus pen, the touch chip first detects noise from the display panel to obtain the in-panel noise value (also referred to as a noise value of the display panel), the touch chip sends the target uplink information to the active stylus pen based on the in-panel noise value, the touch chip receives the target downlink information returned by the active stylus pen under the target pen voltage based on the target uplink information, and the target downlink information includes the position information; in other words, the present disclosure is capable of sending corresponding target uplink information to the active stylus pen based on the in-panel noise value of a high noisy picture when the display panel displays the high noisy picture, and the active stylus pen returns the target downlink information by using the target pen voltage; and that is to say, for different in-panel noise values in the display panel, the active stylus pen returns the target downlink information by using corresponding target pen voltages, which can improve the SNR of the active stylus pen. In addition, the present disclosure determines a coordinate distance value between position coordinates based on coordinate information of the position coordinates of the position information, and the present disclosure uses a target report rate to report contact information of the active stylus pen generated on the display panel based on the coordinate distance value; that is to say, the present disclosure can use different target report rates to report the contact information generated by the active stylus pen on the display panel based on different coordinate distance values, which further improves the SNR of the active stylus pen, thereby improving the writing performance of the active stylus pen and ensuring the use effect of the active stylus pen.

BRIEF DESCRIPTION OF THE DRAWINGS

In order to more clearly illustrate the technical solutions in embodiments of the present disclosure, the following will briefly introduce the drawings used in the description of the embodiments. Apparently, the drawings in the following description are only some embodiments of the present disclosure, and those skilled in the art can also obtain other drawings according to these drawings without creative work.

DETAILED DESCRIPTION

The following will provide a clear and complete description of the technical solution in embodiments of the present disclosure in conjunction with drawings in the embodiments. Apparently, the described embodiments are only a part of the embodiments of the present disclosure, not all of them. Based on the embodiments in the present disclosure, all other embodiments obtained by those skilled in the art without creative work should fall within the scope of protection of the present disclosure.

In the description of the present disclosure, it should be understood that terms "first" and "second" are used for descriptive purposes only and cannot be understood as indicating or implying relative importance or implying the number of indicated technical features. Thus, the features defined with "first" or "second" may be explicitly or implicitly defined to include one or more of the described features. In the description of the present disclosure, "multiple" means two or more unless specifically defined otherwise.

In the present disclosure, the term "exemplary" means "used as an example, illustration, or explanation". Any embodiment described as "exemplary" in the present disclosure may not necessarily be interpreted as more preferred or advantageous than other embodiments. In order to enable those skilled in the art to implement and use the present disclosure, the following description is given. In the following description, details are listed for explanatory purposes. It should be understood that ordinary of those skilled in this field can recognize that the present disclosure can also be implemented without using these specific details. In other embodiments, well-known structures and processes will not be explained in detail to avoid unnecessary details that may obscure the description of the present disclosure. Therefore, the present disclosure is not intended to be limited to the embodiments in the following description, but is consistent with the widest range of principles and features disclosed in the present disclosure.

Figure 1:
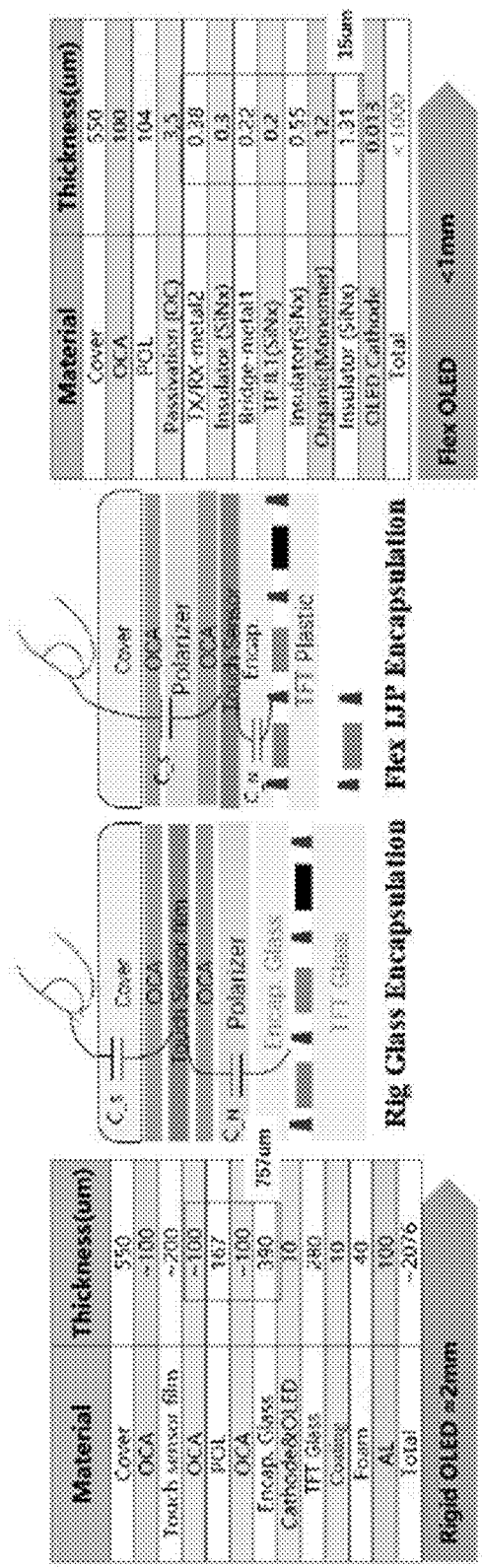
FIG. 1 is a schematic diagram of the comparison between a stacked structure of a rigid display screen and a stacked structure of a flexible display screen provided in an embodiment of the present disclosure.

Referring to FIG. 1, a comparison of between a stacked structure of a rigid organic light-emitting diode (Rigid OLED) display screen and a stacked structure of a flexible OLED display screen (Flex OLED) is shown. From FIG. 1, it can be seen that:

(1) A total thickness of the rigid display screen is 2 millimeters (mm), and the rigid OLED display screen is encapsulated in rigid glass. A touch electrode layer (i.e., the touch sensor film) and a cathode layer (i.e., the cathode & OLED) in the rigid display screen have optical adhesive (i.e., the OCA), a polarizer (i.e., the POL), and encapsulated glass (i.e., the Encap Glass) between them, thereby resulting in a distance of 757 micrometers (um) between the touch electrode layer and the cathode layer of the rigid display screen.

(2) A total thickness of the flexible display screen is less than 1 mm, and the flexible display screen is encapsulated by using ink jet printing (IJP). Insulation layers (i.e., the Insulator) between a transmission end electrode TX/reception end electrode RX layer (i.e., the TX/RX-metal 2) and a cathode layer (i.e., the OLED Cathode), a bridge-metal layer (i.e., the Bridge-metal), a touch insulation layer (i.e., the TP IL1), and an organic layer (Organic) are disposed between a touch electrode layer and a cathode layer in the flexible display screen, thereby resulting in a distance of 15 um between the touch electrode layer and the cathode layer of the flexible display screen.

Figure 2:
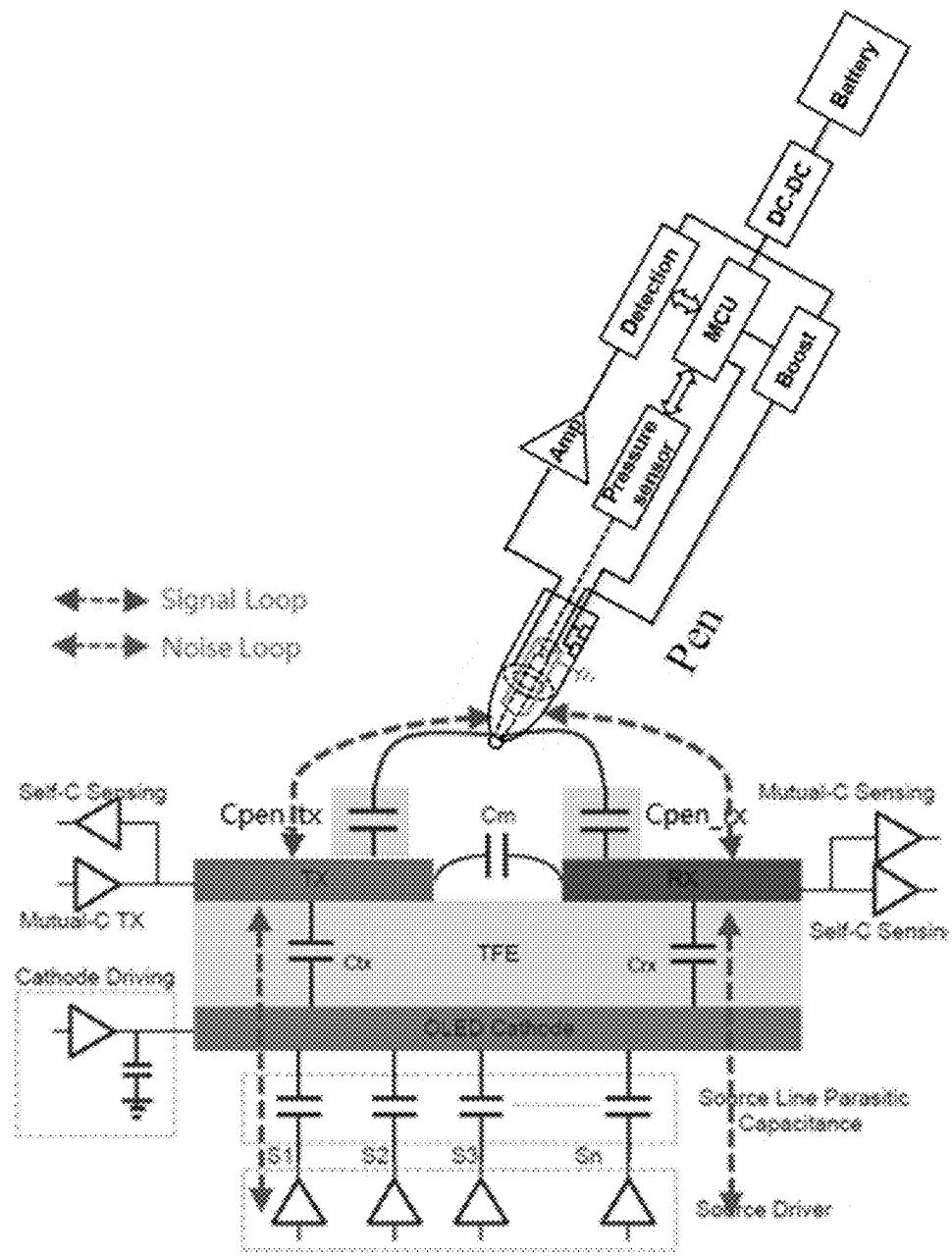
FIG. 2 is a schematic diagram of a SNR of an active stylus pen provided in an embodiment of the present disclosure.

Referring to FIG. 2, a signal loop and a noise loop during an interaction process between an active stylus pen and a display panel are shown. As a distance between the touch electrode layer and the cathode layer is a main source of display panel noise, it can be seen from FIG. 2 that if the distance between the touch electrode layer (i.e., the TX/RX electrode) and the cathode layer (i.e., the OLED Cathode) is smaller, the noise displayed on the touch electrode layer (i.e., the TX/RX electrode) is greater, and the SNR of the active stylus pen is worse. Therefore, The SNR of current flexible screen architecture combined with the active stylus pen is insufficient, mainly due to a thin thickness of the flexible screen.

Based on current debugging and testing, it can be found that the SNR of the active stylus pen can meet the requirement when the display panel displays a picture with low noise in a normal pattern. However, in the noise pattern, when the display panel displays a picture with high noise, the SNR of the active stylus pen cannot meet the requirement, which results in problems such as broken lines in the writing of the active stylus pen, and this problem hinders the use of active stylus pens combined with flexible screens.

To solve the above problems, the embodiments of the present disclosure provide a display driving method, a display device, and an active stylus pen, which are described in detail below.

In some embodiments of the present disclosure, the present disclosure provides a display driving method applied to a display device. The display device in the present disclosure includes a flexible display device and a rigid display device. The display device includes a display panel and a touch panel, and the touch panel interacts with the active stylus pen through touch.

Figure 3:
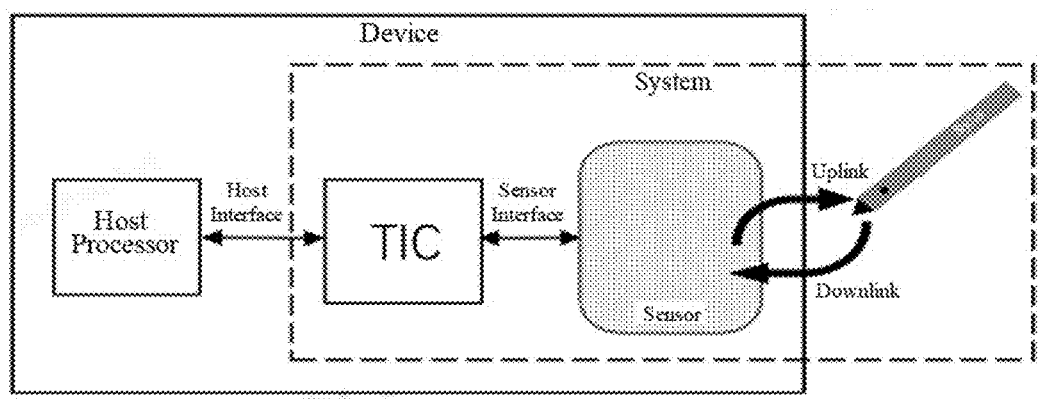
FIG. 3 is a schematic diagram of a working system of the active stylus pen provided in an embodiment of the present disclosure.

Before introducing the display driver method provided in the present disclosure, a touch interaction principle between the display device and the active stylus pen is first introduced. FIG. 3 is a schematic diagram of the touch interaction between the touch panel and the active stylus pen. The touch panel includes a host processor, a touch chip (i.e., the integrated circuit abbreviated as TIC), and a sensor. The sensor includes TX electrodes and RX electrodes arranged in an array, The TX electrode and RX electrode are insulated, and the host processor is communicated to the touch chip through a host interface. The touch chip is electrically connected to the sensor through a sensor interface, and both TX and RX electrodes are electrically connected to the sensor interface.

In an application process, for example, the active stylus pen is communicated with the display device through the universal stylus initiative (USI) protocol, the active stylus pen will return the downlink information (i.e., the DownLink) corresponding to the uplink information to the display device after the active stylus pen receives the uplink information (i.e., the UpLink) sent by the display device, so that the display device displays according to the operation of the active stylus pen.

Figure 4:
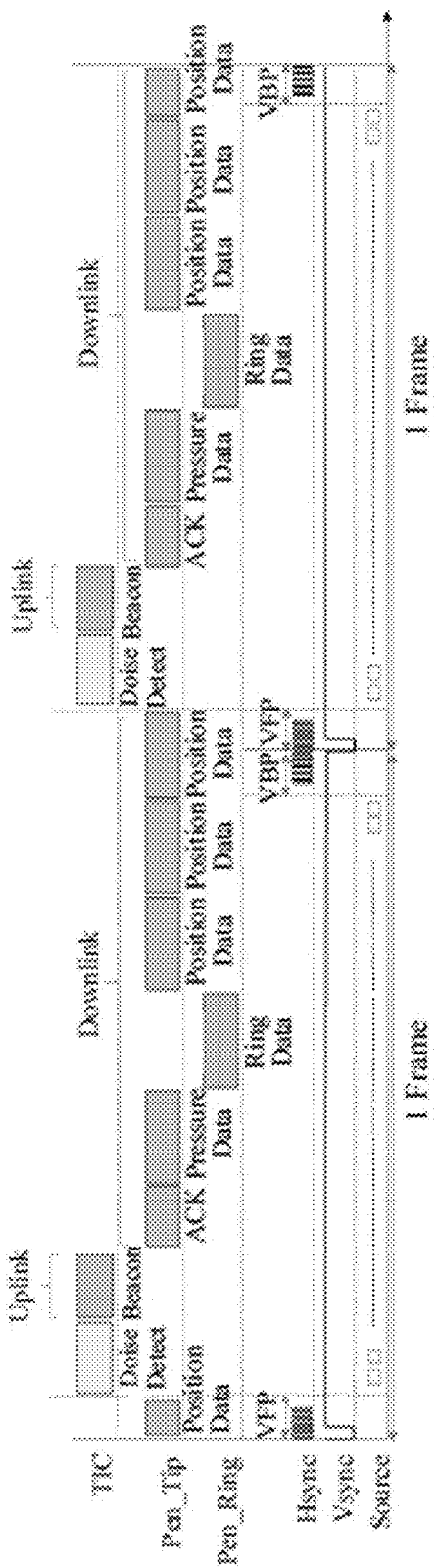
FIG. 4 is a schematic diagram of a time sequence of uplink information and downlink information provided in an embodiment of the present disclosure.

Referring to FIG. 4, FIG. 4 is a schematic diagram of a time sequence of uplink information and downlink information during an interaction process between the touch chip and the active stylus pen. A frame (i.e., the 1 Frame) is divided into multiple time periods, that is, the frame in FIG. 4 includes a first time period VFP, a third time period VBP, and a second time period located between the first time period VFP and the third time period VBP.

On premises that the interaction between the touch chip and the active stylus pen 2 has been established and a frame of signals of the display device can be transmitted normally, firstly, the TIC will scan position information (i.e., the position data) in downlink information returned by a pen tip of the active stylus pen in the first time period of the current frame, and then the touch chip detects in-panel noise in the display panel based on noise detection information (i.e., the Noise Detect) in the second time period. When the active stylus pen is working, the active stylus pen first receives the uplink information sent by the TIC. Beacon in FIG. 4 refers to synchronization information in the uplink information sent by the TIC, and the synchronization information is used to complete timing synchronization between the touch chip and the active stylus pen. After the active stylus pen receives the uplink information, the active stylus pen sends the downlink information according to information requirements. The downlink information includes response information (i.e., the ACK), position information (i.e., the Position Data), and tilt angle information (Ring Data), pressure information (i.e., the Pressure Data), identification number information (i.e., the ID), etc. At the same time, other data in the display device can be sent normally, that is, row synchronization signal (i.e., the Hsync), column synchronization signal (i.e., the Vsync), and data signal (i.e., the source) can be sent normally according to corresponding changes in a frame rate.

Figure 5:
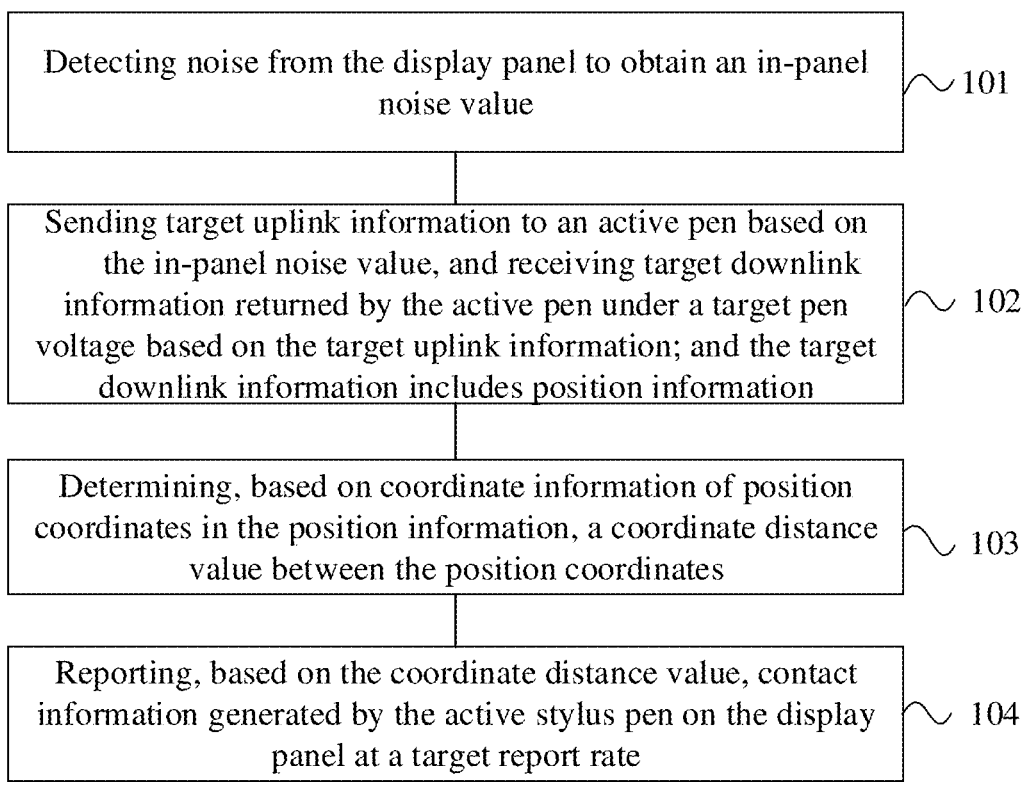
FIG. 5 is a schematic flowchart of a display driving method provided in an embodiment of the present disclosure.

Referring to FIG. 5, FIG. 5 is a schematic flowchart of a display driving method provided in an embodiment of the present disclosure. It should be noted that although the logical order is shown in the flowchart, in some cases, the steps shown or described in FIG. 5 can be executed in a different order. The display driving method includes the following steps.

Step 101: detecting noise from the display panel to obtain an in-panel noise value.

In the embodiment, the display panel includes display time frames, and each of the display time frames includes a first time period VFP, a second time period VBP, and a third time period. Specifically, the second time period is located between the first time period VFP and the third time period VBF in sequence.

In the embodiment, the detecting noise from the display panel to obtain in-panel noise value includes:
receiving a noise detection signal in a second time period of a current display time frame; and detecting the noise from the display panel based on the noise detection signal, thereby to obtain the in-panel noise value.

Specifically, in an application process, the host processor in the touch panel sends a noise detection signal to the touch chip. After the touch chip receives the noise detection signal, the touch chip sets both the TX electrode and RX electrode as receiving ends. At this time, the TX electrode and RX electrode are configured as noise sensing metal layers to sense the noise in the display panel, and sensed noise is returned to the touch chip by an analog signal. The touch chip processes the sensed noise and feeds processed noise back to the host processor, and the host processor calculates a corresponding in-panel noise value.

Step 102: sending target uplink information to an active stylus pen based on the in-panel noise value, and receiving target downlink information returned by the active stylus pen under a target pen voltage based on the target uplink information.

In the embodiment, the target uplink information includes scanning sequential information and frequency hopping information. The scanning sequential information is used to indicate a work time sequence of the touch chip and a work time sequence of the active stylus pen. The frequency hopping information is configured to indicate waveform frequency points of the target downlink information of the active stylus pen. The target downlink information includes position information, response information, inclination angle information, pressure information, and identification number information of the active stylus pen.

Figure 6:
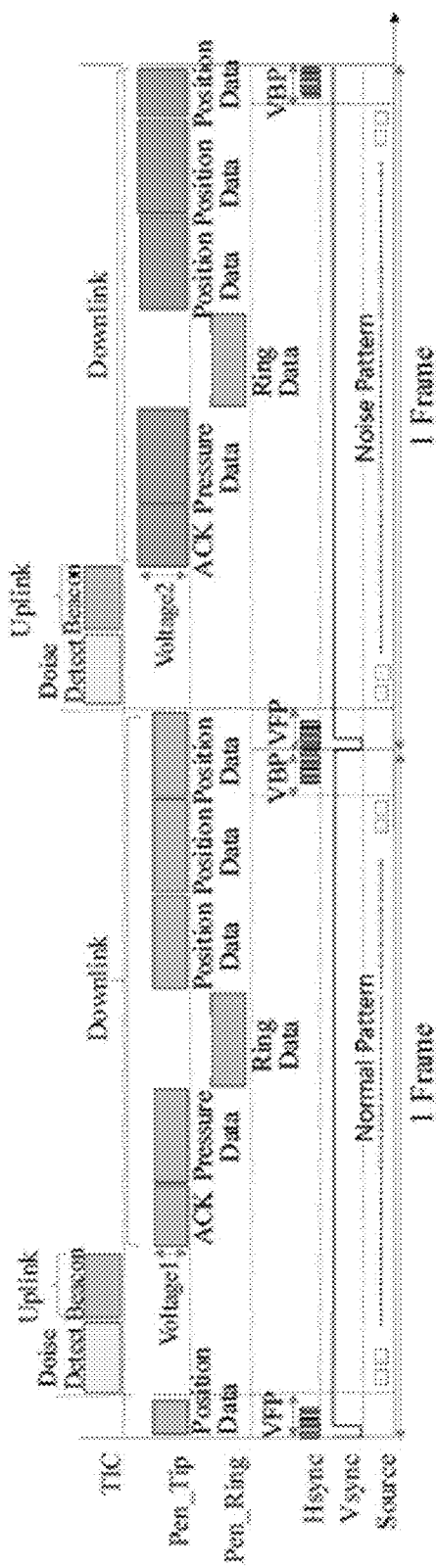
FIG. 6 is a schematic diagram of a time sequence of uplink information and downlink information provided in an embodiment of the present disclosure.

Referring to FIG. 6, the sending target uplink information to an active stylus pen based on the in-panel noise value, and receiving target downlink information returned by the active stylus pen under a target pen voltage based on the target uplink information includes:
sending the target uplink information to the active stylus pen in the second time period of the current display time frame based on the in-panel noise value; and
receiving, based on the target uplink information, the target downlink information returned by the active stylus pen under the target pen voltage based on the target uplink information in the second time period of the current display time frame, a third time period of the current display time frame, and a first time period of a next display time frame.

In the embodiment, specifically, the touch chip will continuously scan the target downlink information returned by the active stylus pen in the current frame and the next frame of the current frame. As the target downlink information includes position information, the scanning cycle of the position information of the target downlink information is increased to enhance the SNR of the active stylus pen on the display device.

In the embodiment, two sets of voltage output mechanisms are provided in the active stylus pen in advance, and the two sets of voltage output mechanisms can be switched based on the uplink information of the touch chip. Referring to FIG. 6, the target uplink information includes first uplink information and second uplink information. The target pen voltage includes a first pen voltage (i.e., the Voltage 1) and a second pen voltage (i.e., the Voltage 2). The first pen voltage is smaller than the second pen voltage. It can be limited that the first pen voltage is a normal pen voltage, and the second pen voltage is a high voltage higher than the first pen voltage. The embodiment does not intend to limit parameter values of the target pen voltage of the active stylus pen, and correspondingly, the target uplink information includes the first uplink information and the second uplink information.

Therefore, specifically, the sending target uplink information to an active stylus pen based on the in-panel noise value, and receiving target downlink information returned by the active stylus pen under a target pen voltage based on the target uplink information includes:
comparing the in-panel noise value with a preset noise threshold value;
in response to the in-panel noise value being smaller than the preset noise threshold value, sending the first uplink information to the active stylus pen, and receiving the target downlink information returned by the active stylus pen under the first pen voltage based on the first uplink information; and
in response to the in-panel noise value being greater than the preset noise threshold value, sending the second uplink information to the active stylus pen, and receiving the target downlink information returned by the active stylus pen under the second pen voltage based on the second uplink information.

In the embodiment, the preset noise threshold value is artificially set in the host processor of the contact panel by experience, and the specific value of the preset noise threshold value does not intend to be limited by the embodiment.

Specifically, when the in-panel noise value is smaller than the preset noise threshold value, the display panel is in the normal pattern, that is, the current picture on the display panel has low noise. In the frame shown on the left in FIG. 6, the active stylus pen returns the target downlink information based on the first pen voltage. When the in-panel noise value is greater than the preset noise threshold, the display panel is in the noise pattern, that is, the current picture on the display panel has high noise. In the frame shown on the right in FIG. 6, the active stylus pen returns the target downlink information based on the second pen voltage.

Therefore, based on the method of the embodiment, the active stylus pen uses the first pen voltage under the normal pattern, the active stylus pen uses the second pen voltage under the noise pattern, and the second pen voltage is higher than the first pen voltage, which enables the SNR of the active stylus pen can meet requirements under the normal pattern and the noise pattern, improves the writing problems of the active stylus pen such as broken lines, enhances the writing performance of the active stylus pen, and ensures the use effect of the active stylus pen.

In the present disclosure, the drawing speed and report rate of the active stylus pen also affect the SNR of the active stylus pen. The report rate of the active stylus pen refers to the number of times the touch chip reports the touch position to the main processor per unit of time when the touch panel detects the touch position of the active stylus pen. Each reported touch position can be one or more. For example, when the drawing speed of the active stylus pen is fast, but the report rate of the active stylus pen is low, it will also lead to poor SNR of the active stylus pen.

Therefore, in the embodiment, the drawing speed of the active stylus pen can be determined based on the position information of the downlink information of the active stylus pen, the report rate can be switched based on the drawing speed, and specific methods are described in steps 103 and 104 below.

Step 103: determining a coordinate distance value between position coordinates based on coordinate information of the position coordinates of the position information.

Figure 7:
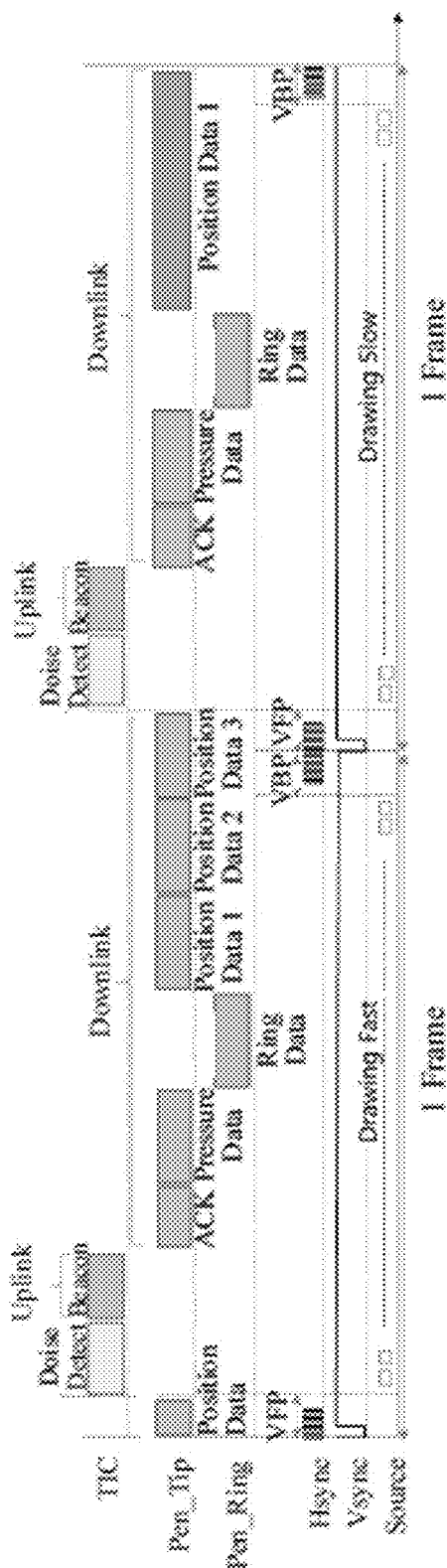
FIG. 7 is a schematic diagram of a time sequence of uplink information and downlink information provided in an embodiment of the present disclosure.

In the embodiment, since the number of position information of the downlink information of the active stylus pen is different in the each of the display time frames, for example, as shown in the left frame of FIG. 7, the downlink information of the active stylus pen contains three position information, while the downlink information of the active stylus pen only contains one position information in the right frame of FIG. 7. Therefore, in the embodiment, the determining, based on coordinate information of position coordinates of the position information, a coordinate distance value between the position coordinates includes:

determining whether the number of position information of the target downlink information in a current display time frame is greater than 1;

in response to the number of the position information of the target downlink information in the current display time frame is greater than 1, determining, based on coordinate information of at least two position information of the position information in the target downlink information in the current display time frame, the coordinate distance value between the at least two position coordinates; and in response to the number of the position information of the target downlink information in the current display time frame is equal to 1, determining, based on coordinate information of the position information of the target downlink information in the current display time frame and coordinate information of the position information in the target downlink information in a previous display time frame, the coordinate distance value between the two position coordinates, or determining, based on coordinate information of the position information of the target downlink information in the current display time frame and coordinate information of the position information of target downlink information in a next display time frame, the coordinate distance value between the two position coordinates.

Specifically, referring to the left frame of FIG. 7, the target downlink information of the current frame includes three position information (i.e., the Position Data1/2/3), that is, the number of position information included in the target downlink information of the current frame is greater than 1, then based on the coordinate information [(x1, y1), (x2, y2), (x3, y3)] of the three position information in the target downlink information of the current frame, a coordinate distance value between the position coordinates is determined, and the coordinate distance value is expressed as d1 and d1=SQRT $[(x1-x3)^2+(y1-y3)^2]$. Referring to the right frame of FIG. 7, the current frame target downlink information only includes one position information (i.e., the Position Data1), that is, the number of position information included in the target downlink information of the current frame is equal to 1, then based on the coordinate information of the position information (x4, y4) in the current frame target downlink information and the coordinate information [(x1, y1), (x2, y2), (x3, y3)] of three position information in the target downlink information of the previous frame, a coordinate distance value between the position coordinates is determined, and the coordinate distance value is expressed as d1 and d1=SQRT $[(x3-x4)^2+(y3-y4)^2]$. The target downlink information of the next frame may also be used to determine the coordinate distance value, here is only an exemplary embodiment.

Step 104: reporting, based on the coordinate distance value, contact information generated by the active stylus pen on the display panel at a target report rate.

In the embodiment, two sets of report rate mechanisms are set in the touch chip in advance. Specifically, two target report rates are set in the touch chip. The two target report rates include a first report rate and a second report rate. The first report rate is greater than the second report rate. The two target report can be limited. Specifically, the first report rate is a high report rate which reports 100 points per second, and the second point reporting rate is a low report rate which reports 60 points per second. The embodiment does not intend to limit parameter values of the target report rate.

In the embodiment, reporting, based on the coordinate distance value, contact information generated by the active stylus pen on the display panel at a target report rate includes:

comparing the coordinate distance value with a preset distance threshold value;

in response to the coordinate distance value being greater than the preset distance threshold value, reporting the contact information generated by the active stylus pen on the display panel at the first report rate; and in response to the coordinate distance value being smaller than the preset distance threshold value, reporting the contact information generated by the active stylus pen on the display panel at the second report rate.

In the embodiment, the preset distance threshold value is artificially set in the host processor of the contact panel by experience. The embodiment does not intend to limit the specific value of the preset distance threshold value.

Specifically, when the coordinate distance value is greater than the preset distance threshold value, the active stylus pen is determined to be in a fast drawing; at this time, the touch chip reports the contact information generated by the active stylus pen on the display panel to the host processor at the first report rate. When the coordinate distance value is less than the preset distance threshold value, the active stylus pen is determined to be in a slow drawing; at this time, the touch chip reports the contact information generated by the active stylus pen on the display panel to the host processor at the second report rate (i.e., the low report rate).

Therefore, based on the above method of the embodiment, when the active stylus pen is in a fast drawing, the active stylus pen uses a high report rate for reporting points, thereby improving the SNR of the active stylus pen. When the active stylus pen is in a slow drawing, the active stylus pen uses a low report rate for reporting points, thereby improving the SNR of the active stylus pen, reducing power consumption, improving the writing performance of the active stylus pen, and ensuring the use effect of the active stylus pen.

Figure 8:
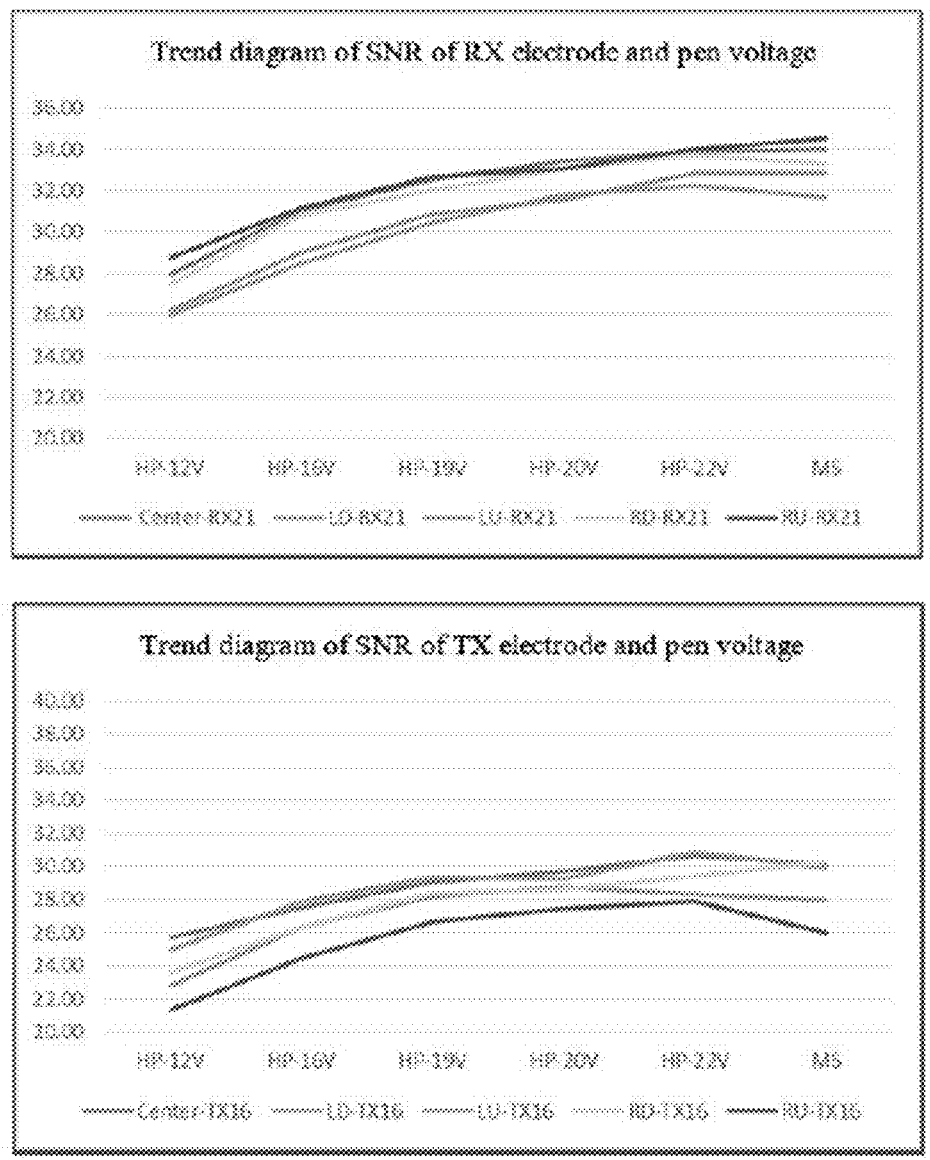
FIG. 8 is a schematic trend diagram of pen voltages and the SNR of the active stylus pen provided in an embodiment of the present disclosure.

After the experimental verification, the display driving method provided in the present disclosure has significantly improved the performance of the active stylus pen. The verification results are shown in FIG. 8. Specifically, the left figure in FIG. 8 shows a trend diagram of the SNR of RX electrode and the pen voltage of the active stylus pen, while the right figure in FIG. 8 shows a trend diagram of the SNR of TX electrode and the pen voltage of the active stylus pen. Based on the experimental verification, the display driving method of the present disclosure has strong applicability in the scheme of combining an active stylus pen with a capacitive touch panel.

Figure 9:
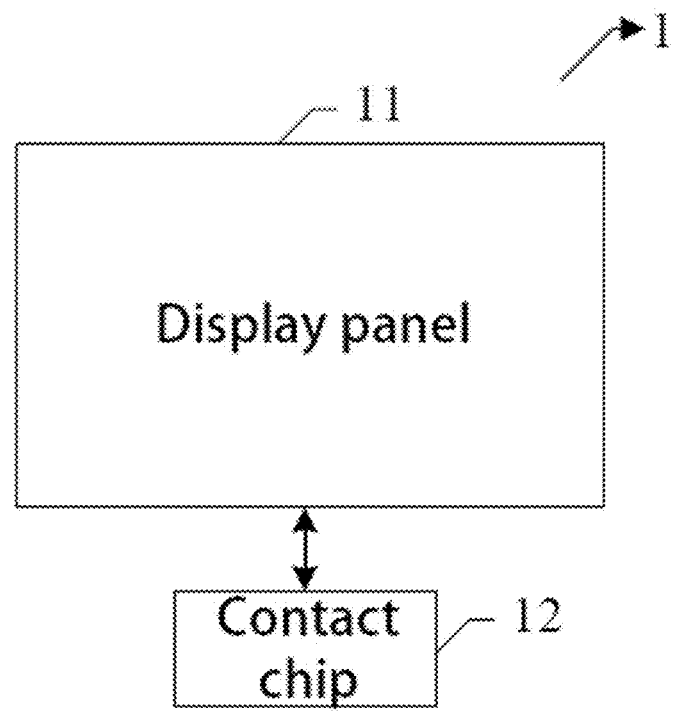
FIG. 9 is a schematic structural diagram of a display device provided in an embodiment of the present disclosure.

In some embodiments of the present disclosure, the present disclosure provides a display device, and the display device includes a flexible display device and a rigid display device. Referring to FIG. 9. The display device 1 includes a display panel 11 and a touch chip 12 connected to the display panel 11. The touch chip 12 is configured to execute the display driving method as described above.

Figure 10:
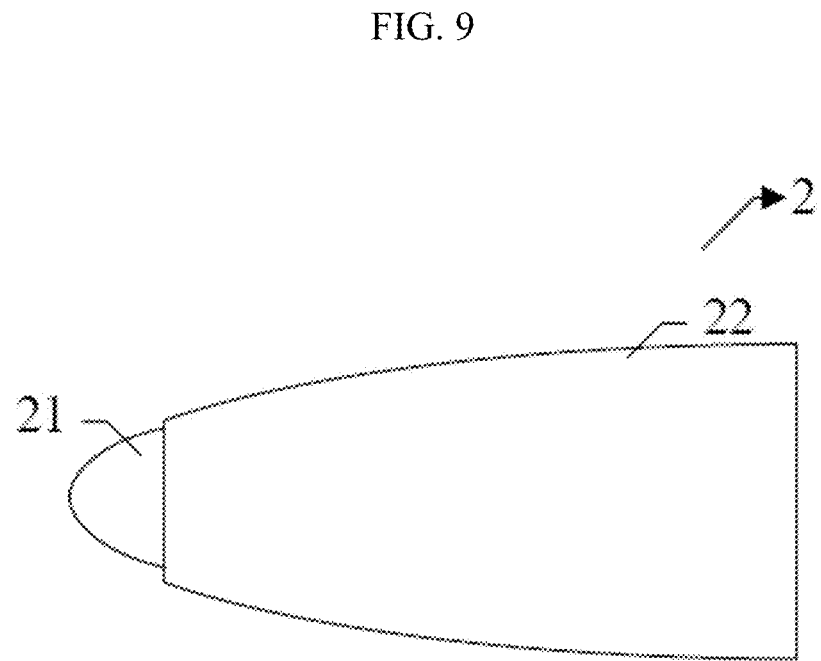
FIG. 10 is a schematic structural diagram of an active stylus pen provided in the embodiment of the present disclosure.

In some embodiments of the present disclosure, the present disclosure provides an active stylus pen. Referring to FIG. 10, the active stylus pen interacts with the display device 1. The active stylus pen 2 is configured to receive target uplink information sent by the touch chip 12 and send target downlink information based on the target uplink information under the target pen voltage. Specifically, the active stylus pen 2 includes a pen tip 21 and a pen ring 22. The pen tip 21 is configured to send response information, position information, pressure information, and identification number information in the target downlink information. The pen ring 22 is configured to send tilt angle information in target downlink information.

The display driving method, the display device, and the active stylus pen provided by the embodiments of the present disclosure are described in detail above, and specific embodiments are used herein to illustrate the principles and embodiments of the present disclosure. The description of the above embodiments is only used to help understand the method and the core idea of the present disclosure. Meanwhile, for those skilled in the art, according to the concept of the present invention, there are changes in the specific embodiment and the application scope, and in summary, the content of the specification should not be interpreted as a limitation of the present disclosure.

What is claimed is:
1. A display driving method, wherein the display driving method is applied to a display device, the display device comprises a display panel, and the display driving method comprises:
  detecting noise from the display panel to obtain an in-panel noise value;
  sending target uplink information to an active stylus pen based on the in-panel noise value, and receiving target downlink information returned by the active stylus pen under a target pen voltage based on the target uplink information, wherein the target downlink information comprises position information;
  determining, based on coordinate information of position coordinates of the position information, a coordinate distance value between the position coordinates; and
  reporting, based on the coordinate distance value, contact information generated by the active stylus pen on the display panel at a target report rate;
  wherein the determining, based on coordinate information of position coordinates of the position information, a coordinate distance value between the position coordinates comprises:
  determining whether the number of the position information of the target downlink information in a current display time frame is greater than 1;
  in response to the number of the position information of the target downlink information in the current display time frame is greater than 1, determining, based on coordinate information of at least two position information of the position information in the target downlink information in the current display time frame, the coordinate distance value between the at least two position coordinates; and
  in response to the number of the position information of the target downlink information in the current display time frame is equal to 1, determining, based on coordinate information of the position information of the target downlink information in the current display time frame and coordinate information of the position information in the target downlink information in a previous display time frame, the coordinate distance value between the two position coordinates, or determining, based on coordinate information of the position information of the target downlink information in the current display time frame and coordinate information of the position information of target downlink information in a next display time frame, the coordinate distance value between the two position coordinates;
  wherein the target report rate comprises a first report rate and a second report rate; and the first report rate is greater than the second report rate;
  the reporting, based on the coordinate distance value, contact information generated by the active stylus pen on the display panel at a target report rate comprises:
  comparing the coordinate distance value with a preset distance threshold value;
  in response to the coordinate distance value being greater than the preset distance threshold value, reporting the contact information generated by the active stylus pen on the display panel at the first report rate; and
  in response to the coordinate distance value being smaller than the preset distance threshold value, reporting the contact information generated by the active stylus pen on the display panel at the second report rate.

2. The display driving method according to claim 1, wherein the display panel comprises display time frames, and each of the display time frames comprises a first time period, a second time period, and a third time period in sequence; and the detecting noise from the display panel to obtain in-panel noise value comprises:
  receiving a noise detection signal in a second time period of a current display time frame; and
  detecting the noise from the display panel based on the noise detection signal, thereby to obtain the in-panel noise value.

3. The display driving method according to claim 2, wherein the sending target uplink information to an active stylus pen based on the in-panel noise value, and receiving target downlink information returned by the active stylus pen under a target pen voltage based on the target uplink information comprises:

sending the target uplink information to the active stylus pen in the second time period of the current display time frame based on the in-panel noise value; and receiving, based on the target uplink information, the target downlink information returned by the active stylus pen under the target pen voltage based on the target uplink information in the second time period of the current display time frame, a third time period of the current display time frame, and a first time period of a next display time frame.

4. The display driving method according to claim 3, wherein the target uplink information comprises first uplink information and second uplink information; the target pen voltage comprises a first pen voltage and a second pen voltage; and the first pen voltage is smaller than the second pen voltage; and wherein the sending target uplink information to an active stylus pen based on the in-panel noise value, and receiving target downlink information returned by the active stylus pen under a target pen voltage based on the target uplink information comprises:

comparing the in-panel noise value with a preset noise threshold value;

in response to the in-panel noise value being smaller than the preset noise threshold value, sending the first uplink information to the active stylus pen, and receiving the target downlink information returned by the active stylus pen under the first pen voltage based on the first uplink information; and in response to the in-panel noise value being greater than the preset noise threshold value, sending the second uplink information to the active stylus pen, and receiving the target downlink information returned by the active stylus pen under the second pen voltage based on the second uplink information.

5. The display driving method according to claim 1, wherein the target uplink information comprises scanning sequential information and frequency hopping information; the scanning sequential information is configured to indicate a work time sequence of a touch chip and a work time sequence of the active stylus pen; and the frequency hopping information is configured to indicate waveform frequency points of the target downlink information of the active stylus pen.

6. The display driving method according to claim 1, wherein the target downlink information further comprises response information, inclination angle information, pressure information, and identification number information of the active stylus pen.

7. A display device, wherein the display device comprises a display panel and a touch chip connected to the display panel; and the touch chip is configured to execute a display driving method, wherein the display driving method is applied to the display device, and the display driving method comprises:

detecting noise from the display panel to obtain an in-panel noise value;

sending target uplink information to an active stylus pen based on the in-panel noise value, and receiving target downlink information returned by the active stylus pen under a target pen voltage based on the target uplink information, wherein the target downlink information comprises position information;

determining, based on coordinate information of position coordinates of the position information, a coordinate distance value between the position coordinates; and reporting, based on the coordinate distance value, contact information generated by the active stylus pen on the display panel at a target report rate;

wherein the determining, based on coordinate information of position coordinates of the position information, a coordinate distance value between the position coordinates comprises:

determining whether the number of the position information of the target downlink information in a current display time frame is greater than 1;

in response to the number of the position information of the target downlink information in the current display time frame is greater than 1, determining, based on coordinate information of at least two position information of the position information in the target downlink information in the current display time frame, the coordinate distance value between the at least two position coordinates; and in response to the number of the position information of the target downlink information in the current display time frame is equal to 1, determining, based on coordinate information of the position information of the target downlink information in the current display time frame and coordinate information of the position information in the target downlink information in a previous display time frame, the coordinate distance value between the two position coordinates, or determining, based on coordinate information of the position information of the target downlink information in the current display time frame and coordinate information of the position information of target downlink information in a next display time frame, the coordinate distance value between the two position coordinates;

wherein the target report rate comprises a first report rate and a second report rate; and the first report rate is greater than the second report rate;

the reporting, based on the coordinate distance value, contact information generated by the active stylus pen on the display panel at a target report rate comprises:

comparing the coordinate distance value with a preset distance threshold value;

in response to the coordinate distance value being greater than the preset distance threshold value, reporting the contact information generated by the active stylus pen on the display panel at the first report rate; and in response to the coordinate distance value being smaller than the preset distance threshold value, reporting the contact information generated by the active stylus pen on the display panel at the second report rate.

8. An active stylus pen, wherein the active stylus pen is configured to interact with a display device, wherein the display device comprises a display panel and a touch chip connected to the display panel; and the touch chip is configured to execute a display driving method, wherein the display driving method is applied to the display device, and the display driving method comprises:

detecting noise from the display panel to obtain an in-panel noise value;

sending target uplink information to an active stylus pen based on the in-panel noise value, and receiving target downlink information returned by the active stylus pen under a target pen voltage based on the target uplink information, wherein the target downlink information comprises position information;

determining, based on coordinate information of position coordinates of the position information, a coordinate distance value between the position coordinates;

reporting, based on the coordinate distance value, contact information generated by the active stylus pen on the display panel at a target report rate;

wherein the determining, based on coordinate information of position coordinates of the position information, a coordinate distance value between the position coordinates comprises:

determining whether the number of the position information of the target downlink information in a current display time frame is greater than 1;

in response to the number of the position information of the target downlink information in the current display time frame is greater than 1, determining, based on coordinate information of at least two position information of the position information in the target downlink information in the current display time frame, the coordinate distance value between the at least two position coordinates; and in response to the number of the position information of the target downlink information in the current display time frame is equal to 1, determining, based on coordinate information of the position information of the target downlink information in the current display time frame and coordinate information of the position information in the target downlink information in a previous display time frame, the coordinate distance value between the two position coordinates, or determining, based on coordinate information of the position information of the target downlink information in the current display time frame and coordinate information of the position information of target downlink information in a next display time frame, the coordinate distance value between the two position coordinates;

wherein the target report rate comprises a first report rate and a second report rate; and the first report rate is greater than the second report rate;

the reporting, based on the coordinate distance value, contact information generated by the active stylus pen on the display panel at a target report rate comprises:

comparing the coordinate distance value with a preset distance threshold value;

in response to the coordinate distance value being greater than the preset distance threshold value, reporting the contact information generated by the active stylus pen on the display panel at the first report rate; and in response to the coordinate distance value being smaller than the preset distance threshold value, reporting the contact information generated by the active stylus pen on the display panel at the second report rate; and the active stylus pen is configured to receive the target uplink information sent by the touch chip and send the target downlink information based on the target uplink information and under the target pen voltage.

* * * * *